Patented May 8, 1951

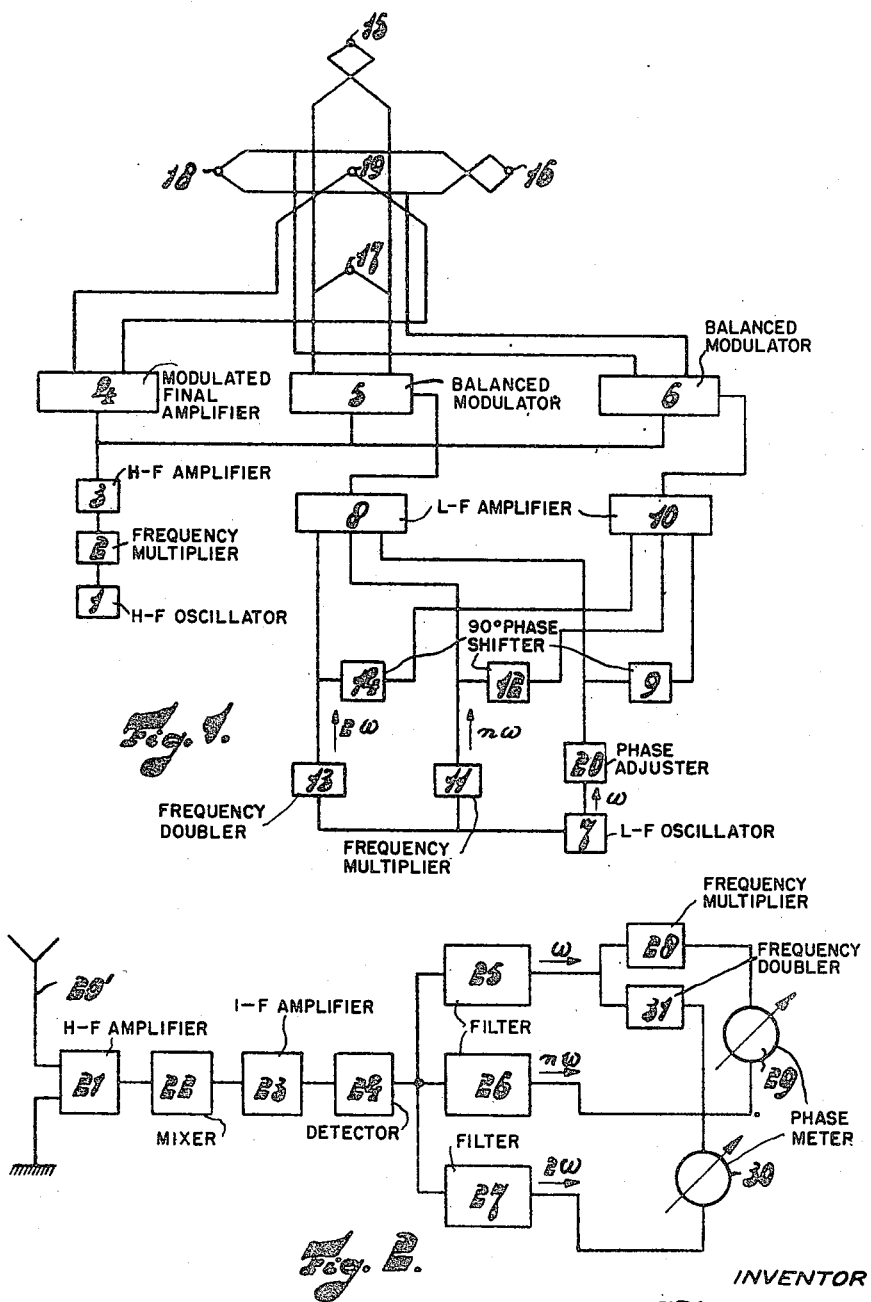

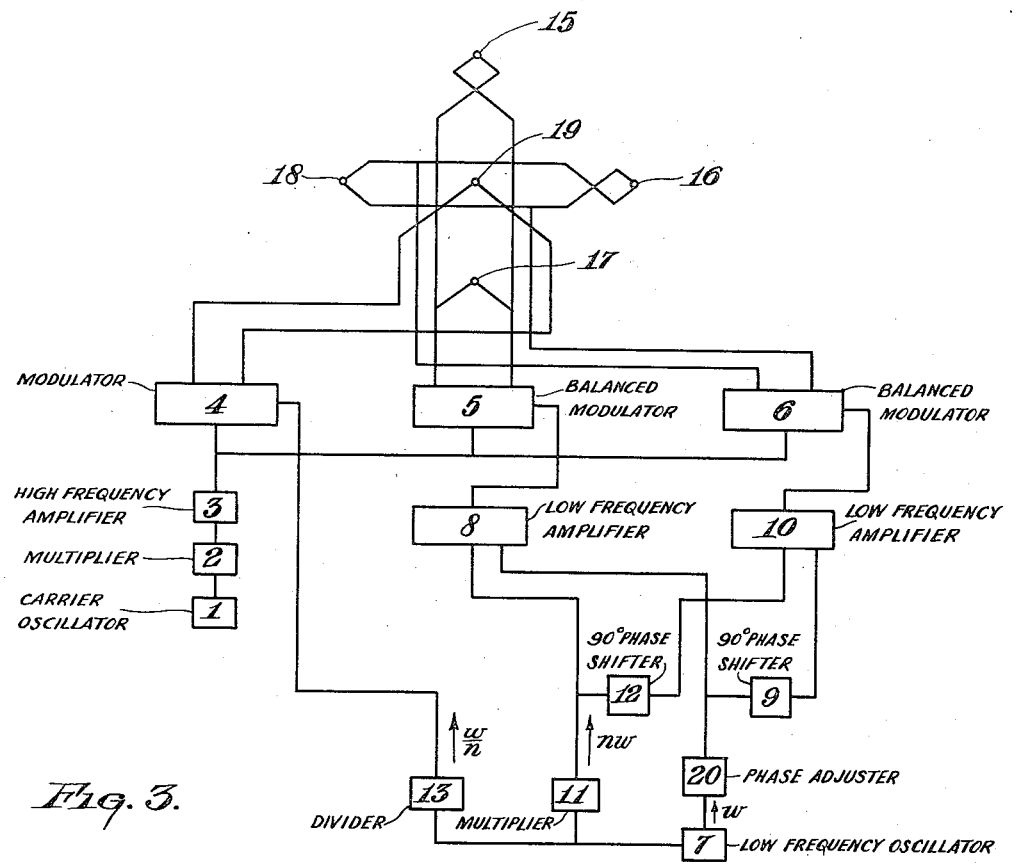

2,551,828

UNITED STATES PATENT OFFICE 2,551,828

RADIO BEACON

Frank de Fremery, Eindhoven, Netherlands, assignor to Hartford National Bank and Trust Company, Hartford, Conn., as trustee Application February 11, 1947, Serial No. 727,765
In the Netherlands February 5, 1944

Section 1, Public Law 690, August 8, 1946
Patent expires February 5, 1964

6 Claims. (Cl. 343—106)

The copending patent application, Serial Number 680,901, filed July 2, 1946, now Patent No. 2,530,600, issued Nov. 21, 1950, discloses a method of determining the direction of a receiver with respect to a beacon transmitter, by means of the angle $\beta$ which the direction to be determined forms with a known orientation direction, this method consisting in that a measuring characteristic which is a measure for the angle $\beta$ is derived from the relative position of two oscillations having different frequencies $\omega$ and $n\omega$ between which a harmonic relation exists and which appear in such a manner that the two oscillations have a phase corresponding with the angle $\beta$.

If $n$ exceeds 2 this method permits the value of the angle $\beta$ to be determined with great delicacy, since a measuring characteristic being a function of $(n\pm 1)\beta$ can be derived from the relative position of the two oscillations $\omega$ and $n\omega$.

If, in effect, the two oscillations $\omega$ and $n\omega$ are emitted in such a manner that in the direction of orientation the two oscillations $\omega$ and $n\omega$ pass at least once through zero simultaneously at least once per cycle of the oscillation having the lower frequency, two oscillations, one of which is proportional to sin. $(\omega t\pm\beta)$ and the other to sin. $(n\omega t\pm\beta)$, are obtained in any direction which forms an angle $\beta$ with the direction of orientation. From these two oscillations the angle $\beta$ to be determined can be derived in various ways, for instance by frequency-multiplication $n$-times of the oscillation having the lower frequency obtained after detection, the result being an oscillation which is proportional to sin. $(n\omega t\pm n\beta)$. By determining the phase angle between the frequency-multiplied oscillation and the oscillation having the higher frequency obtained after detection, which is proportional to sin. $(n\omega t\pm\beta)$, a measuring characteristic is obtained which is determined by $(n\pm 1)\beta$, thus obtaining a great measuring accuracy.

However, in the space surrounding the beacon device $n\pm 1$ sectors are formed, between which the measured angle $(n\pm 1)\beta$ varies in any instance from 0 to $2\pi$ radials, so that the obtained measuring characteristic indicates the possible position of the direction to be determined in each of these sectors, due to which the spacial angle is not determined unequivocally by the measuring characteristic in question.

In order to avoid ambiguity of the measuring characteristic in cases, where it may give rise to trouble, a third oscillation having a frequency, which is harmonically related to at least one of the oscillations $\omega$ and $n\omega$, is, according to the invention, transmitted in such a manner as to permit a measuring characteristic, which is an unequivocal measure of the angle $\beta$, to be derived from the relative position of the third oscillation and the oscillation having a frequency $\omega$ or $n\omega$ which is harmonically related thereto.

The frequency of the third oscillation preferably amounts to half or double the frequency of one of the oscillations $\omega$ or $n\omega$, and the phase of the third oscillation varies in the same sense with the direction as the phase of the said oscillation $\omega$ or $n\omega$.

In another embodiment of the invention the frequency of the third oscillation is a subharmonic of the frequency of one of the oscillations $\omega$ and $n\omega$, the phase of the third oscillation being independent with respect to the direction.

When using the method according to the invention there are obtained two indications of the direction to be determined, one of which is ambiguous and proportional to $(n\pm 1)\beta$, whereas the other determines the angle $\beta$ unequivocally. By these two indications, which reveal the accurate position of the direction to be determined in a definite sector and the spacial sector in question respectively, the direction to be determined is fixed unequivocally.

A special advantage of the method according to the invention consists in that the purpose aimed at is attained with a minimum of additional means in a beacon transmitter and receiver. This holds more particularly where the third oscillation is transmitted modulated on a carrier wave having the same frequency as the oscillations $\omega$ and $n\omega$, as is preferably the case.

The relative position of the third oscillation and the two other oscillations is preferably such that these oscillations pass at least once through zero simultaneously per cycle of the oscillation having a frequency $\omega$. By this adjustment one may be sure that those indications $\beta$ and $(n\pm 1)\beta$ have direction of orientation in common.

In order that the invention may be clearly understood and readily carried into effect it will now be described more fully with reference to the accompanying drawing, given by way of example.

In the drawing, wherein like elements are referred to by like reference numerals;

Fig. 1 is a schematic diagram of a preferred embodiment of a beacon transmitter in accordance with the invention, Fig. 2 is the schematic diagram of a receiver for intercepting signals of the type transmitted by the beacon shown in Fig. 1, and Fig. 3 is the schematic diagram of a second preferred embodiment of a beacon transmitter in accordance with the invention.

Fig. 1 represents diagrammatically a form of construction of a beacon device which is suitable for carrying out the method according to the invention. In this beacon device a high-frequency oscillator 1 generates high-frequency oscillations which, as the case may be, are supplied through a frequency-multiplication device 2 and a high-frequency amplifier 3 to a final amplification stage 4 and two push-pull modulators 5 and 6, in both of which modulators the high-frequency oscillations are modulated with carrier-wave suppression by two oscillations having frequencies $\omega$ and $n\omega$, between which a harmonic relation exists, and by a third oscillation $2\omega$ whose frequency amounts to double the frequency of one of the oscillations $\omega$ and $n\omega$. The modulating oscillation having a frequency $\omega$ is generated by means of an oscillator 7 and supplied on the one hand to the modulator 5 through an amplifier 8, and on the other hand to the push-pull modulator 6 through a phase shifter 9 bringing about a phase displacement of 90° and an amplifier 10. By means of a frequency-amplification device 11 the modulating oscillation having a frequency $n\omega$ is derived from oscillations generated by the oscillator 7 and supplied on the one hand, through the low-frequency amplifier 8, to the modulator 5, and on the other hand through a phase-shifter 12 and the low-frequency amplifier 10 to the modulator 6. The third modulating oscillation having a frequency $2\omega$ is taken, by means of a frequency-multiplication device 13, from the oscillation generated by the oscillator 7 and supplied on the one hand, through the amplifier 8, to the push-pull modulator 5, and on the other hand through a phase-shifter 14 and the amplifier 10 to the modulator.

In addition, the beacon device shown in Fig. 1 comprises four vertical dipole aerials 15, 16, 17 and 18 which are placed in the angles of deviation of a square and extend normally to the plane of the drawing, an aerial 19 being placed at the centre of the square and extending parallel with the other aerials.

The oscillations appearing in the output circuit of the power amplifier 4 are supplied to the central aerial 19, whereas the oscillations appearing in the output circuits of the modulators 5 and 6 are supplied in phase-opposition to the aerials 15, 17 and 16, 18 respectively located at the diagonal points of the square.

Consequently, in the aforesaid device the aerials placed at the angles of deviation of the square are fed in such a manner that the phase displacement between the modulation of the modulated oscillations supplied to every two neighbouring aerials is equal to the spacial angle of 90° between the two aerials. This results in that a high-frequency field, which is modulated by three oscillations $\omega$, $n\omega$ and $2\omega$, is radiated in such a manner that the phase of each of the oscillations obtained after detection is dependent with respect to the direction. The phase shifters 9 and 14 are adjusted in such a manner that the current in the antenna 13 for the two oscillations $\omega$ and $2\omega$ is leading and lagging respectively with respect to that in the remaining aerials, as a result of which the phases of the modulations $\omega$ and $2\omega$ vary in the same sense with the direction.

By means of phase shifter 20 it can be achieved that the relative position of the three oscillations $\omega$, $n\omega$ and $2\omega$ obtained after detection is fixed in a definite direction (direction of orientation) and is preferably such that the three oscillations simultaneously pass through zero at least once per cycle of the oscillation having a frequency $\omega$. Consequently, in any direction forming an angle $\beta$ with the direction of orientation three oscillations are obtained after detection, one of which is proportional to $\sin.(\omega t-\beta)$, the second to $\sin.(n\omega t-\beta)$ and the third to $\sin.(2\omega t-\beta)$.

According to the invention the angle to be determined is derived both from the oscillations $\sin.(\omega t-\beta)$ and $\sin.(n\omega t-\beta)$ and from the oscillations $\sin.(\omega t-\beta)$ and $\sin.(2\omega t-\beta)$.

The oscillations $\sin.(\omega t-\beta)$ and $\sin.(n\omega t-\beta)$, as has been set out in the above identified copending application, permit the angle to be determined to be derived by $n$-times frequency-multiplication of the oscillation having the lower frequency obtained after detection, which yields an oscillation proportional to $\sin.(n\omega t-n\beta)$. By determining the phase angle between the frequency-multiplied oscillation and the oscillation having the higher frequency obtained after detection, which is proportional to $\sin.(n\omega t-\beta)$, a measuring characteristic is obtained which is determined by $(n-1)\beta$.

Similarly the oscillations proportional to $\sin.(\omega t-\beta)$ and $\sin.(2\omega t-\beta)$ permit a measuring characteristic to be derived which is determined by $(n-1)\beta=\beta$, since in this case $n=2$.

Consequently, by a slight extension of transmitting apparatus, viz. by providing the devices 13 and 14, the ambiguity of the accurate indication achieved by the transmission of the oscillations $\omega$ and $n\omega$ is completely obviated, whereby the usefulness of the method set out in the above mentioned patent application is materially increased.

A form of construction suitable for the reception of the oscillations transmitted by means of a device as shown in Fig. 1, is represented in Fig. 2. In this device the modulated oscillations picked up by an aerial 20′ are supplied to a high-frequency amplifier 21 which is connected in cascade with a mixing stage 22, an intermediate-frequency amplifier 23 and a detector 24. The output circuit of the detector comprises three filters 25, 26 and 27 that are tuned to the frequency $\omega$, the frequency $n\omega$ and the frequency $2\omega$ respectively.

To derive the angle $\beta$ from the oscillations $\omega$ and $n\omega$ the oscillations having the lower frequency $\omega$ are supplied to a phase meter 29 through a frequency-multiplication device 28, whereas the oscillations having the frequency $n\omega$ are directly supplied to a phase meter 29, the latter determining the phase angle $(n-1)\beta$ between the frequency-multiplied oscillation having the lower frequency and the oscillation having the higher frequency $n\omega$. In order to cure the ambiguity of the indication thus obtained another phase meter 30 is provided to which the oscillation having a frequency $2\omega$ is directly supplied, and the oscillation having a frequency $\omega$ is supplied through a frequency-doubling device 31. In the phase-meter 30 is determined the phase-angle $\beta$ between the oscillations supplied thereto having a frequency $2\omega$. If desired, only one phasemeter may be used. In this case it is necessary to provide switches by which either the output voltage of the frequency amplifier 28 and of the filter 26 or the output voltage of the frequency doubler 31 and of the filter 27 are simultaneously supplied to the phase meter.

It stands to reason that for deriving a measuring characteristic, which is determined by $(n-1)\beta$ and $\beta$ respectively, from the relative position of the oscillations having the frequencies $\omega$, $n\omega$ and $\omega$, $2\omega$ respectively, which are obtained in the receiver after detection, use may also be made of a device other than that shown in Fig. 2.

The aforesaid receiving device is suitable not only for the reception of the oscillations transmitted by means of a device shown in Fig. 1 but lends itself, in principle, to the reception of all beacon devices that may be used for carrying out the method according to the invention, it being only necessary that the filters interposed in the output circuit of the detector 24 are tuned respectively to the three oscillations transmitted by the beacon transmitter.

A receiving device according to the invention preferably comprises automatic gain control or a limiter so as to achieve an indication which is independent of the amplitude of the oscillations $\omega$, $n\omega$ and $2\omega$.

If desired, as shown in Fig. 3, the third oscillation may also be transmitted with a frequency-independent phase by the beacon transmitter; in this case the aerial 19 may be used for transmitting the third oscillation. The frequency of the third oscillation produced in device 13 acting as a divider and fed to modulator 14 whose output is fed to aerial 19 may then be a subharmonic of one of the oscillations $\omega$ and $n\omega$, the relative position of two oscillations with a frequency-dependent and a frequency-independent phase respectively yielding a measuring characteristic which is an unequivocal measure of the angle $\beta$ if the phase of the oscillation having frequencies harmonically related with the lower frequency is independent with respect to the direction.

What I claim is:

1. In a radio beacon, a transmitter comprising means for omnidirectionally propagating in space a carrier wave, and means for propagating in space a suppressed carrier wave having first and second modulation components whose frequencies are different and harmonically related and a third modulation component whose frequency is a harmonic of one of said first and second components, each component having a space-phase depending on bearing.

2. In a radio beacon, a transmitter comprising a carrier wave source, first, second and third oscillatory modulation sources having different and harmonically related frequencies, a pair of balanced modulators, means to apply each of said first, second and third modulations in phase quadrature to said balanced modulators, means to apply said carrier wave to said balanced modulators to combine with the modulations therein, said carrier wave being suppressed in said balanced modulators, first antenna means coupled to said wave source for radiating said carrier wave omnidirectionally, second antenna means coupled to said balanced modulators and disposed in predetermined relation to said first antenna means for radiating a rotating field constituted by said suppressed carrier wave with said first, second and third modulations, the space-phase of said modulations being a function of bearing.

3. An arrangement, as set forth in claim 2, wherein said second antenna means includes four radiating elements positioned at the corners of a square, one of the balanced modulators being coupled to one pair of diagonally opposed elements for energizing said elements in opposite phase, the other of said balanced modulators being coupled to the other pair of diagonally opposed elements for energizing said elements in opposite phase.

4. In a radio beacon, a transmitter comprising a carrier wave source, an oscillatory modulation source, a pair of balanced modulators each having two inputs, means to apply said carrier wave to one input of said modulators, a frequency multiplier coupled to said modulation source, a frequency doubler coupled to said modulation source, means for applying in phase quadrature the original modulation from said modulation source, the multiplied modulation from said multiplier and the doubled modulation from said doubler to the other input of said modulators, said modulators suppressing said carrier wave, first antenna means coupled to said carrier wave source for radiating said carrier wave omnidirectionally, and second antenna means coupled to said modulators and disposed in predetermined relation to said first antenna means for radiating a rotating field constituted by the suppressed carrier wave with said first, second and third modulations.

5. A transmitter, as defined in claim 4, further including an adjustable phase shifter interposed between said modulation source and the other input of said modulators for effecting a predetermined phase relation between the original modulation and the multiplied and doubled modulations.

6. In a radio beacon system wherein a carrier wave is transmitted as well as a suppressed carrier wave with first, second and third modulation components whose frequencies are harmonically related and whose space-phase depends on bearing, a receiver for said waves comprising means to detect said waves to derive said modulation components, filter means to separate said components, frequency multiplying means coupled to said filter means for equating the frequencies of said components, phase indicating means to compare said first and second components, and phase indicating means to compare said second and third components.

FRANK DE FREMERY.

REFERENCES CITED

The following references are of record in the file of this patent:

UNITED STATES PATENTS

| Number | Name | Date |
| --- | --- | --- |
| 1,922,677 | Greig et al. | Aug. 15, 1933 |
| 2,252,699 | Byrne | Aug. 19, 1941 |
| 2,253,958 | Luck | Aug. 26, 1941 |
| 2,394,157 | Earp | Feb. 5, 1946 |
| 2,422,110 | Luck | June 10, 1947 |

FOREIGN PATENTS

| Number | Country | Date |
| --- | --- | --- |
| 385,521 | Great Britain | Dec. 29, 1932 |